United States Patent [19]

Tomoshige et al.

[11] 4,315,863
[45] Feb. 16, 1982

[54] HIGHLY MALEATED WAX AND PROCESS FOR PRODUCING THE SAME

[75] Inventors: Toru Tomoshige, Otake; Harumi Furuta, Iwakuni; Akihiro Tachi, Otake; Nobuyuki Kawamoto, Yanai, all of Japan

[73] Assignee: Mitsui Petrochemical Industries, Ltd., Tokyo, Japan

[21] Appl. No.: 175,701

[22] Filed: Aug. 6, 1980

[30] Foreign Application Priority Data

Aug. 10, 1979 [JP] Japan ............................ 54-101169

[51] Int. Cl.³ ............................................ C07D 307/60
[52] U.S. Cl. ................................ 260/346.74; 106/271
[58] Field of Search .................. 260/346.74; 106/270, 106/271

[56] References Cited

U.S. PATENT DOCUMENTS 4,039,560  8/1977  Tomoshige ................ 260/346.74
4,218,263  8/1980  Kawabata et al. ......... 260/346.74

*Primary Examiner*—John M. Ford
*Assistant Examiner*—Bernard Dentz
*Attorney, Agent, or Firm*—Cushman, Darby & Cushman

[57] ABSTRACT

A maleated saturated hydrocarbon wax having a number-average molecular weight of 500 through 6000, a content of a maleic anhydride unit of 14 through 40% by weight and a melt viscosity of $10^2$ through $10^6$ centipoises at 140° C. is disclosed. This maleated wax is self-emulsifiable and the emulsion thereof can be stored for a long period of time, even in a very dilute emulsion. This maleated wax is produced from the reaction of a saturated hydrocarbon wax with the specified amount of maleic anhydride, in the presence of an organic peroxide, at the specified temperature by adding the maleic anhydride and the organic peroxide to the molten saturated hydrocarbon wax at the specified rates.

4 Claims, No Drawings

HIGHLY MALEATED WAX AND PROCESS FOR PRODUCING THE SAME

The present invention relates to a maleated saturated hydrocarbon wax having excellent properties. More specifically, it relates to a maleated saturated hydrocarbon wax which is self-emulsifiable and which results in an emulsion that is very stable even when the emulsion is very diluted. The present invention also relates to a process for producing the maleated saturated hydrocarbon wax.

The term "maleated saturated hydrocarbon wax" as used herein means a modified saturated hydrocarbon wax which is derived from the grafting of maleic anhydride to a saturated hydrocarbon wax. The term "saturated hydrocarbon wax" as used herein means a hydrocarbon wax having unsaturated bonds in the molecule in an amount of not more than 1.5 per 1000 carbon atoms. The term "self-emulsifiable" wax used herein means that the wax can be emulsified or can be in emulsion without any auxiliary agent, such as a surface active agent.

It is widely known in the art that a maleic anhydride grafted wax (i.e. maleated wax) can be obtained from the reaction of a wax with maleic acid in the presence of a peroxide (see, for example, U.S. Pat. No. 4039,560). The maleated wax is used, as an amulsion, in, for example, a lustering agent, a coating composition, an ink, a covering material, a paper treating agent and a textile treating agent. However, since the content of the grafted maleic anhydride in a commercially available conventional maleated wax is low, a truely stable emulsified product of the maleated wax cannot be obtained unless the maleated wax is partially converted to the alkali metal salt thereof or a surface active agent is used. In particular, in the case where a very dilute emulsion of the maleated wax having a good stability is to be obtained, the use of the above-mentioned auxiliary means is necessary.

In the case where a coating is formed by the use of the emulsion of the maleated wax containing, for example, a surface active agent, various problems such as a poor water resistance of, for example, the coating, and decreases in, for example, the hardness and the strength, of the film are caused due to the presence of the impurities. Furthermore, in the case where the emulsion of the conventional maleated wax containing, for example, a surface active agent is coated on various substrates at room temperature to form a coating thereon, there is a problem that a coating having a good clarity and a good gloss is difficult to obtain.

On the other hand, a maleated wax which has a very high content of the grafted maleic anhydride (e.g., 14% by weight or more) and which is self-emulsifiable has not been provided. Even in the cases where attempts have been made to produce a highly maleated wax according to conventional techniques, gelation takes place and a product which is self-emulsifiable cannot be obtained.

Accordingly, an object of the present invention is to obviate the afore-mentioned problems of the prior arts and to provide a highly maleated saturated hydrocarbon wax which has a good melt flow property and is self-emulsifiable in heated water without using any auxiliary agent.

Another object of the present invention is to provide a highly maleated saturated hydrocarbon wax, the emulsion of which can be stored stably for a long period of time even if it is very diluted.

A further object of the present invention is to provide a highly maleated saturated hydrocarbon wax which is capable of forming a coating having an excellent clarity, gloss, hardness and adhesive property, even when the emulsion thereof is coated at room temperature.

A still further object of the present invention is to provide a process for producing a highly maleated saturated hydrocarbon wax having an excellent self-emulsifiable property and excellent film-forming properties at room temperature.

Other objects and advantages of the present invention will be apparent from the description set forth hereinbelow.

In accordance with the present invention, there is provided a maleated saturated hydrocarbon wax having a number-average molecular weight of 500 through 6000, preferably 600 through 4000, a content of a maleic anhydride unit of 14 through 40% by weight, preferably 17 through 30% by weight, more preferably 17 through 26% by weight, and a melt viscosity at 140° C. of $10^2$ through $10^6$ centipoises, preferably $2 \times 10^2$ through $5 \times 10^5$ centipoises.

In accordance with the present invention, there is also provided a process for producing a maleated saturated hydrocarbon wax comprising the step of; reacting a melt of a saturated hydrocarbon wax having a number-average molecular weight of 400 through 5000 with 16 through 70 parts by weight, based on 100 parts by weight of the starting wax, of maleic anhydride in the presence of an organic peroxide at a temperature of from the melting point of the saturated hydrocarbon wax to 220° C. by adding the maleic anhydride and the organic peroxide to the molten saturated hydrocarbon wax in such manners that the addition rate of the maleic anhydride is within the range of 0.1 to 10 parts by weight per hour, based on 100 parts by weight of the starting saturated hydrocarbon wax, and that the addition rate of the organic peroxide is within the range of 5.0 to 30.0% by mol, based on the addition mol number of the maleic anhydride.

The starting saturated hydrocarbon wax used in the production of the highly maleated wax of the present invention is those which have unsaturated bonds in the molecule in an amount of not more than 1.5, preferably 1.0 or less, based on 1000 carbon atoms. This amount can be easily determined by quantitatively determining the total number of the vinyl and vinylidene groups from the IR spectrum of the wax. Examples of the saturated hydrocarbon wax used in the present invention are: polyethylene waxes which are derived from the polymerization of ethylene or the copolymerization of ethylene and other alpha-olefins, in the presence of hydrogen, in an inactive solvent, at a temperature of 120 through 300° C., by using a titanium compound highly activated with a magnesium compound, and an organoaluminum compound: polymethylene waxes which are derived from a Fischer-Tropsh synthesis and the subsequent hydrogenation by using a conventional hydrogenation catalyst; hydrogenated products of cracked waxes derived from high molecular weight polyethylene; and the like. These waxes can be used alone or in any mixtures thereof.

In a case where a hydrocarbon wax having a relatively large amount of the unsaturated bonds, such as, the cracked wax derived from high-pressure-produced polyethylene, the wax obtained, as a by-product, from the production of low or medium-pressure-polyethylene is used, only maleated wax having a high gel content can be obtained. This maleated wax is not self-emulsifiable and is unpreferably colored, so that it is not suitable for practical use. Contrary to this, the highly maleated saturated hydrocarbn wax of the present invention can be emulsified in heated water having a temperature of more than the melting point of the wax, without using any auxiliary agent, under pressure.

The process for producing the highly maleated saturated hydrocarbon wax according to the present invention can be carried out under such a condition that the starting saturated hydrocarbon wax is in a molten state, that is, at a temperature of not less than the melting point of the starting wax, and preferably, not more than 220° C., and more preferably, at a temperature of 140 through 200° C. Although the use of a diluent is not preferable from the point of view of the reaction rate and the reaction yield, a diluent can be used in an amount of less than approximately 30% by weight, based on the starting saturated hydrocarbon wax. In the case where a diluent is used in the present invention, the use of alkylated aromatic hydrocarbons, which are reactive with maleic anhydride, is not preferable. Preferable examples of the diluent optionally used in the present invention are halogenated hydrocarbons, aliphatic hydrocarbons, alicyclic hydrocarbons, benzene and the like.

According to the present invention, although the starting saturated hydrocarbon wax in a molten state is reacted with maleic anhydride by adding maleic anhydride and an organic peroxide to the starting wax in a molten state or the reaction mixture, the addition rates of the maleic anhydride and the organic peroxide are important to produce the desired highly maleated unsaturated hydrocarbon wax. That is to say, the maleic anhydride should be added to the starting wax in a molten state at a rate such that the addition amount of the maleic anhydride is within the range of 0.1 to 10 parts by weight per hour, preferably 0.5 to 5 parts by weight per hour, based on 100 parts by weight of the saturated hydrocarbon wax. Furthermore, the addition rate of the organic peroxide is determined within the range of 5.0 to 30.0% by mol, preferably 10.0 through 25.0% by mol, based on the addition mol number of the maleic anhydride.

In a case where the addition rate of the maleic anhydride is more than the upper limit of the above-mentioned range, the average graft chain length of the maleic anhydride unit becomes more than 2. As a result, since a homopolymer of maleic anhydride is formed, as a by-product, the color of the molten product, and the gloss and the clarity of the coating derived therefrom are not acceptable and also, since the desired grafted amount of the maleic anhydride cannot be obtained, the self-emulsifiable wax is not preferably produced. Contrary to this, when the addition rate of the maleic anhydride is less than the lower limit of the above-mentioned range, not only does the productivity of the process unpreferably and uneconomically decrease, but also, the commercial value of the product unpreferably decreases due to the fact that the product is unpreferably colored.

On the other hand, in a case where the addition rate of the organic peroxide is less than or more than the range specified above, gelation is likely to occur in the reaction.

Although the continuous addition of the maleic anhydride and the organic peroxide to the starting saturated hydrocarbon wax is preferable, the addition can be carried out batchwise or intermittently. However, it should be noted that, when a large amount of the maleic anhydride or the organic peroxide is added at one time, gelation is caused in the reaction product and the desired self-emulsifiable property of the product is impaired. Therefore, in the case where the maleic anhydride or the organic peroxide is batchwise or intermittently added to the starting wax or the reaction mixture, the maleic anhydride or the organic peroxide should be added to the starting wax or the reaction mixture in such an amount that the gelation is not caused in the reaction product and also that the desired self-emulsifiable property of the product is not impaired.

The organic peroxides used in the present invention include those preferably having a half-life period, at a reaction temperature, of $10^{-2}$ through 5 hours. Examples of such organic peroxides are: alkyl peroxide, such as tert.-butyl cumyl peroxide, dicumyl peroxide, di-tert.-butyl peroxy diiospropylbenzene, 2,5-dimethyl-2,5-(di-tert.-butyl peroxy)hexane, 2,5-dimethyl-2,5-(di-tert.-butyl peroxy)hexyne-3, di-tert.-butyl peroxide and the like; acyl peroxides, such as acetyl peroxide, propionyl peroxide, benzoyl peroxide and the like, and; peroxy esters, such as tert.-butyl peroxy laurate, tert.-butyl peroxy benzoate and the like. Among these peroxides, alkyl peroxides, such as tert.-butyl cumyl peroxide, dicumyl peroxide, di-tert.-butyl peroxy diisopropylbenzene, 2,5-dimethyl-2,5-(di-tert.-butyl peroxy)hexane, 2,5-dimethyl-2,5-(di-tert.-butyl peroxy)hexyne-3, di-tert.-butyl peroxide and the like can be preferably used in the present invention.

The content of the maleic anhydride unit in the maleated saturated hydrocarbon wax of the present invention should be within the range of 14 to 40% by weight, preferably 17 to 30% by weight, based on the total weight of the maleated wax. In a case where the content of the maleic anhydride unit is less than the lower limit of the range specified above, the self-emulsifiable property of the maleated wax is impaired and, therefore, a stable emulsion thereof cannot be obtained unless an auxiliary agent, such as a surface active agent, is used. Contrary to this, when the content of the maleic anhydride unit is more than the upper limit of the range specified above, since the melt viscosity of the maleated wax remarkably increases or since gelation is caused in the reaction product, it is not suitable for use in the form of an emulsion.

In order to produce the maleated wax having the above-mentioned content of the maleic anhydride unit, 1.0 through 1.2 times of the theoretical amount of the maleic anhydride unit contained in the maleated wax, that is, approximately 16 through 70 parts by weight, based on 100 parts by weight of the starting wax, can be added at the addition rate specified above. The content of the grafted maleic anhydride unit can be obtained from the oxygen content of the purified maleated wax, which is determined by an elemental analysis of the wax after a ring-closing treatment of the maleic acid groups in the purified maleated wax. After the completion of the addition of the total amounts of the maleic anhydrode and the organic peroxide to the starting wax, the reaction can be continued.

The number-average molecular weight of the highly maleated wax of the present invention (determined according to an ebulliometer method) should be within the range of 500 to 6000, preferably 600 to 4000. This range of the number-average molecular weight results in good coating properties and a suitable melt viscosity. In order to produce the highly maleated wax of the present invention having the above-mentioned range of the number-average molecular weight, the used of a starting wax having a number-average molecular weight of 400 through 5000, preferably 500 through 3000, is desirable.

The melt viscosity, at 140° C., of the maleated wax of the present invention should be within the range of $10^2$ to $10^6$ cps, preferably $2 \times 10^2$ through $5 \times 10^5$ cps. When the melt viscosity of the maleated wax of the present invention is more than the upper limit of the above-mentioned range, the self-emulsifiable property of the maleated wax is impaired due to the increase in the degree of the cross linking of the maleated wax. Contrary to this, when the melt viscosity of the maleated wax of the present invention is less than the lower limit of the above-mentioned range, the coating properties and water resistance of the maleated wax are impaired. The melt viscosity of the maleated wax sometimes increases to some extent by the action of water present in air due to the ring opening of the maleic anhydride units contained in the maleated wax. The above-specified melt viscosity means those determined with respect to the maleated wax in which the maleic anhydride units are in a ring-open state (i.e. in the state of maleic acid).

Furthermore, the highly maleated wax of the present invention preferably has the average graft chain length of the maleic anhydride unit of 1 through 2, more preferably 1 through 1.5. In a case where the average graft chain length of the maleic anhydride unit is more than 2, a homopolymer of the maleic anhydride is formed, as a byproduct, and therefore, the color of the maleated product, and the brightness and the clarity of the coating derived therefrom are not acceptable. The average graft chain length of the maleic anhydride unit can be determined according to a $C^{13}$ NMR method.

The highly maleated wax of the present invention having the above-specified maleic anhydride unit content, number-average molecular weight and melt viscosity, and preferably having the above-mentioned average graft chain length of the maleic anhydride unit, can be emulsified in heated water, under pressure, without using, for example, surface active agents, alkali metal hydroxides, ammonia, amines and the like. The resultant emulsion can be stably stored for a long period of time even as a very dilute emulsion. Furthermore, in the case where an emulsion containing the highly maleated wax of the present invention and not containing a surface active agent and the like is coated on a substrate (e.g. glass, metals), a coating or film having a good clarity, surface gloss and hardness is obtained. In addition, since the present highly maleated wax is not unpreferably colored and generally has a Gardner number of not more than 11, the present wax can be suitably used in, for example, various coating materials, coating compositions, inks, fiber or textile treating agents, paper coating agents, paper additives and cross-linking agents.

The emulsion of the present highly maleated wax can be prepared in any known manner. For instance, the highly maleated wax of the present invention and an appropriate amount (e.g. 150 through 900 parts by weight, based on 100 parts by weight of the wax) of water are mixed together at a temperature of no less than the melting point of the wax and, then, the resultant mixture is cooled to form a stable emulsion.

The present invention is will be further illustrated by the following Examples. However, it should be noted that the present invention is by no means limited to such Examples. In the following Examples, a surface gloss, a Sward Rücker hardness, a static and a dynamic friction coefficients and the stability of the self-emulsified liquid were determined as follows.

(1) Surface Gloss

A 10% maleated wax emulsion in water was coated, by a wire coater, on the surface of a glass plate and air-dried. Thus, a film having a thickness of approximately 10 microns was prepared.

The surface gloss of the film was determined by using a color studio at a gloss angle of 20° (reflection) at a temperature of 23° C.

(2) Sward Rücker Hardness

The hardness of the film obtained above was determined by using a Sward Rücker hardness meter at a temperature of 23° C.

(3) Static and Dynamic Friction Coefficient

The static and dynamic friction coefficients were obtained from a resistance when a stainless steel plate having a size of 30 mm × 30 mm and having a total load of 387 g (including the weight of the plate) was slidden on the surface of the film obtained above at a speed of 200 mm/min. The resistance was measured by a Shimazu autograph.

(4) Stability of Self-Emulsified Liquied

The emulsified wax was diluted to an emulsion having a wax content of 3% by a deionized water and allowed to stand for 3 days in a glass tube having a size of 10 mm$\phi$ × 20 cmH. The height of the separated solid portion was measured and the ratio (%) the the height of the separated solid portion to the total liquid height was calculated. The stability was evaluated as follows.

Excellent: No substantial separation occurs.

Poor: The above-mentioned ratio is 1.0% or more.

EXAMPLE 1

1000 g of polyethylene wax having a number-average molecular weight ($\overline{Mn}$) of 800, a density of 0.95 g/cm$^3$ and unsaturated bonds in an amount of 0.7 per 1000 carbon atoms was placed in a 2 liter glass reactor. The polyethylene wax was obtained from the polymerization of ethylene in the presence of, as a chain transfer agent, hydrogen by using a catalyst comprising a solid catalyst consisting of titanium tetrachloride carried on magnesium chloride and triethyl aluminum.

The polyethylene wax was externally heated and melted in the glass reactor and the inside atmosphere of the reactor was replaced with nitrogen.

Into the reactor, 250 g (2.57 mol) of liquid maleic anhydride, the temperature of which was maintained at 60° C., and 62 g (0.42 mol) of di-tert.-butyl peroxide were dropwise added, with stirring, at a constant speed, over 12.5 hours, from separate dropping funnels fixed on the top of the reactor. During the period of this addition, the inside of the reactor was kept under a nitrogen atmosphere and the reaction mixture was maintained at a temperature of 160° C. under good stirring conditions.

After the completion of the dropwise addition, the agitation was continued at a temperature of 160° C. for a further one hour. After that, the inside of the reactor was maintained at a pressure of 5 mmHg, for 5 hours, with stirring, whereby volatile components such as unreacted maleic anhydride and peroxide decomposition products were removed from the reactor. The resultant reaction product in a molten state was a clear pale yellow-brown liquid having a Gardner number of 5. The product has a $\overline{\text{Mn}}$ of 1250, a density of 1.2 g/cm$^3$ a melting point of 109° C., a melt viscosity of 6500 cps at 140° C., a maleic anhydride content of 19% by weight, a penetration of 0, a compression strength of 210 kg/cm$^2$ and an average graft chain length of the maleic anhydride unit of the purified maleated wax of 1.3.

30 g of the maleated wax obtained as mentioned above and 170 g of distilled water were charged into an autoclave made of stainless steel. After closing the autoclave, the mixture was maintained at a temperature of 140° C., for one hour, with stirring and, then, cooled to a temperature of 40° C. in 2 hours. Thus, a translucent self-emulsified liquid having an excellent stability (the degree of the stability of the emulsion was excellent) was obtained. The self-emulsified liquid had a pH of 3, a viscosity of 80 cps and a minimum film-forming temperature of 2° C. A film having a thickness of 7 microns and obtained from the above mentioned self-emulsified liquid on the surface of a glass plate, after drying at an ambient temperature, had a excellent gloss, clarity, hardness and lubricity. That is, the surface gloss was 70%, the Sward Rücker hardness 40, the static friction coefficient on the glossy surface of a stainless steel plate 0.13 and the dynamic friction coefficient 0.13.

EXAMPLE 2

1000 g an ethylene-propylene copolymer wax (a weight ratio of 98:2) having a $\overline{\text{Mn}}$ of 800, a density of 0.93 and unsaturated bonds in an amount of 0.5 per 1000 carbon atoms was modified, in lieu of the polyethylene wax used in Example 1, in the same manner as described in Example 1. The modified wax thus obtained had a $\overline{\text{Mn}}$ of 1200, a density of 1.0 g/cm$^3$, a melting point of 102° C., a melt viscosity of 6000 cps at 140° C., a maleic anhydride content of 19% by weight, a penetration of 2, a compression strength of 140 kg/cm$^2$ and a Gardner number of 5.

The modified wax prepared above was self-emulsified in a manner as described in Example 1. A self-emulsified liquid having an excellent stability was obtained. The emulsion had a pH of 3, a viscosity of 70 cps and a minimum film-forming temperature of 1° C. A film having a thickness of 7 microns was obtained from the emulsion by applying the emulsion to the surface of a glass plate, followed by drying at an ambient temperature. The film had a gloss of 130%, a Sward Rücker hardness of 40, a static and dynamic friction coefficient, on the glossy surface of a stainless steel plate, of 0.13 and 0.13, respectively.

EXAMPLE 3

The modification of Example 1 was repeated in the same manner as described in Example 1, except that 1000 g of a wax prepared by a Fischer-Tropsch synthesis, followed by hydrogenation and purification, and having a $\overline{\text{Mn}}$ of 600, a density of 0.94 g/cm$^3$ and unsaturated bonds in an amount of 0.8 per 1000 carbon atoms was used, in lieu of the polyethylene wax of Example 1. The modified wax thus obtained had a $\overline{\text{Mn}}$ of 700, a density of 1.1 g/cm$^3$, a melt viscosity of 480 cps at 140° C., a melting point of 82° C., a maleic anhydride content of 19% by weight, a penetration of 0 and a Gardner number of 8.

A self-emulsified liquid having an excellent stability when it was diluted was obtained from the modified wax in a manner as described in Example 1.

EXAMPLE 4

The graft reaction and the post treatment of Example 1 was repeated, except that 190 g (1.94 mol) of maleic anhydride and 47 g (0.32 mol) of di-tert.-butyl peroxide were used. The reaction product thus obtained had a $\overline{\text{Mn}}$ of 1300, a density of 1.0 g/cm$^3$, a melt viscosity of 890 cps at 140° C., a maleic anhydride content of 15% by weight, a penetration of 1 and a Gardner number of 5.

A self-emulsified liquid having an excellent stability when it was diluted was obtained from the modified wax in a manner as described in Example 1.

COMPARATIVE EXAMPLE 1

The graft reaction and the post treatment of Example 1 was repeated, except that 140 g (1.43 mol) of maleic anhydride and 35 g (0.24 mol) of di-tert.-butyl peroxide were used. The reaction product thus obtained had a $\overline{\text{Mn}}$ of 900, a density of 0.98 g/cm$^3$, a melt viscosity of 160 cps at 140° C., a maleic anhydride content of 12% by weight, a penetration of 4 and a Gardner number of 5.

A self-emulsified liquid having only a poor stability when it was diluted was obtained from the modified wax in a manner as described in Example 1.

EXAMPLE 5

The graft reaction and the post treatment of Example 1 was repeated, except that 31 g (0.21 mol) of di-tert.-butyl peroxide was used. The modified wax thus obtained had a $\overline{\text{Mn}}$ of 1300, a density of 1.2 g/cm$^3$, a melt viscosity of 86000 cps at 140° C., a maleic anhydride content of 19% by weight, a penetration of 0 and a Gardner number of 4.

A self-emulsified liquid having a viscosity of 30 cps at 25° C. and having an excellent stability when it was diluted was obtained from the modified wax in a manner as described in Example 1. This emulsion formed a good film on the surface of a glass plate at an ambient temperature.

COMPARATIVE EXAMPLE 2

The graft reaction and the post treatment of Example 1 was repeated, except that 16 g (0.11 mol) of di-tert.-butyl peroxide was used. The modified wax had a density of 1.1 g/cm$^2$, a maleic anhydride content of 18% by weight and a Gardner number of 4. However, since the modified wax was not completely dissolved in decaline at 135° C., the average-number molecular weight could not be determined. Furthermore, since the molten modified wax was very viscous and gelled, the melt viscosity also could not be determined.

The modified wax obtained as mentioned above was emulsified in a manner as described in Example 1. However, the modified wax could not be self-emulsified and the emulsion thus obtained merely had a poor stability when it was diluted.

EXAMPLE 6

The graft reaction and the post treatment of Example 1 was repeated, except that 366 g (0.21 mol) of 2,5-dimethyl-bis(2,5-di-tert.-butyl peroxy)hexyne was used in lieu of 62 g (0.42 mol) of di-tert.-butyl peroxide of Example 1. The modified wax thus obtained had a $\overline{\text{Mn}}$ of 1300, a density of 1.2 g/cm$^3$, a melt viscosity of 12000 cps at 140° C., a maleic anhydride content of 19% by weight and a Gardner number of 11.

A self-emulsified liquid having a good stability when it was diluted was obtained from the modified wax in a manner as described in Example 1.

COMPARATIVE EXAMPLE 3

The graft reaction was started in a manner as described in Example 1, except that 185 g (2.57 mol) of acrylic acid, which was freshly purified by vacuum distillation, was used in lieu of 2.57 mol of maleic anhydride of Example 1. The acrylic acid was dropwise added, at room temperature, at a constant speed, together with di-tert.-butyl peroxide, in such a manner that the total dropwise addition was completed in 12.5 hours. However, approximately 5 minutes after the starting of the dropwise addition, the reaction mixture started to become turbid due to the formation of white solids. The white solids which were the particles of the homopolymer of acrylic acid were remakably adhered to the glass wall of the gas phase portion of the reactor in approximately one hour. Since stirring became impossible 8 hours after the beginning of the dropwise addition, the reaction was stopped.

The reaction product thus obtained was an opaque gelled substance which was brown-white in a molten state. No substantial self-emulsification occurred when self-emulsification of the reaction product was attempted under at the conditions described in Example 1.

EXAMPLE 7

The graft reaction and the post treatment of Example 1 was repeated, except that an ethylene-butene copolymer wax having a $\overline{M}n$ of 1500, a density of 0.92 and unsaturated bonds in an amount of 0.4 per 1000 carbon atoms was used, in lieu of the polyethylene wax of Example 1 and the maleic anhydride and the di-tert.-butyl peroxide was dropwise added for 8 hours. The ethylene-butene copolymer (a weight ratio of 96.5:3.5) was prepared by copolymerizing ethylene and butene-1 in the presence of, as a chain transfer agent, hydrogen by using a catalyst comprising a solid catalyst consiting of titanium tetrachloride carried on magnesium chloride and diethyl aluminum chloride. The modified wax thus obtained had a $\overline{M}n$ of 2100, a desnity of 0.99 g/cm$^3$, a melt viscosity of 189000 cps at 140° C., a maleic anhydride content of 18% by weight, a penetration of 3 and a Gardner number of 6.

A self-emulsified liquid having a good stability when it was diluted was obtained from the modified wax in a manner as described in Example 1.

EXAMPLE 8

The graft reaction and the post treatment of Example 1 was repeated, except that 318 g (3.24 mol) of maleic anhydride and 78 g (0.53 mol) of di-tert.-butyl peroxide were used. The modified wax thus obtained had a $\overline{M}n$ of 1400, a density of 1.3 g/cm$^3$, a melt viscosity of 75000 cps at 140° C., a maleic anhydride content of 23% by weight, a penetration of 0 and a Gardner number of 7.

A self-emulsified liquid having an excellent stability when it was diluted was obtained from the modified wax in a manner as described in Example 1. The minimum film-forming temperature of the emulsion was 1° C. A film obtained from the emulsion on the surface of a glass plate after drying at an ambient temperature had a surface gloss of 155, a Sward Rücker hardness of 45, and a static and dynamic friction coefficient of 0.13 and 0.13, respectively.

EXAMPLE 9

The graft reaction and the post treatment of Example 1 was repeated, except that the maleic anhydride and the di-tert.-butyl peroxide were dropwise added for 8 hours, in lieu of 12.5 hours in Example 1. The modified wax thus obtained had a $\overline{M}n$ of 1200, a density of 1.2 g/cm$^3$, a melt viscosity of 13000 cps at 140° C., a maleic anhydride content of 19% by weight, a penetration of 0 and a Gardner number of 4. Turbidity was observed in the molten modified wax.

A self-emulsified liquid having an excellent stability when it was diluted was obtained from the modified wax in a manner as described in Example 1.

What is claimed is:

1. A process for producing a maleated saturated hydrocarbon wax comprising the step of reacting a melt of a saturated hydrocarbon wax having a number-average molecular weight of 400 through 5000 selected from the group consisting of polyethylene waxes which are derived from the polymerization of ethylene or the copolymerization of ethylene and other alpha-olefins, in the presence of hydrogen, in an inactive solvent, at a temperature of 120 through 300° C., by using a titanium compound highly activated with a magnesium compound, and an organoaluminum compound; polymethylene waxes which are derived from a Fischer-Tropsch synthesis and the subsequent hydrogenation by using a conventional hydrogenation catalyst; hydrogenated products of cracked waxes derived from high molecular weight polyethylene, and mixtures thereof with 16 through 70 parts by weight, based on 100 parts by weight of the starting wax, of maleic anhydride in the presence of an organic peroxide at a temperature of from the melting point of the saturated hydrocarbon wax to 220° C. by continuously adding the maleic anhydride and the organic peroxide to the molten saturated hydrocarbon wax in such a manner that the addition rate of the maleic anhydride is within the range of 0.1 to 10 parts by weight per hour, based on 100 parts by weight of the starting saturated hydrocarbon wax, and that the addition rate of the organic peroxide is within the range of 5.0 to 30.0% by mol, based on the addition mol number of the maleic anhydride.

2. A maleated saturated hydrocarbon wax having a number-average molecular weight of 500 through 6000, a content of a maleic anhydride unit of 17 to 30% by weight and, a melt viscosity of $10^2$ through $10^6$ centipoises at 140° C., and the average graft chain length of the maleic anhydride unit of said wax is in the range of from 1 to 2 wherein the saturated hydrocarbon wax used to produce said maleated saturated hydrocarbon wax has a number-average molecular weight of 400 through 5000 and is selected from the group consisting of polyethylene waxes which are derived from the polymerization of ethylene or the copolymerization of ethylene and other alpha-olefins, in the presence of hydrogen, in an inactive solvent, at a temperature of 120 through 300° C., by using a titanium compound highly activated with a magnesium compound, and an organoaluminum compound; polymethylene waxes which are derived from a Fisher-Tropsch synthesis and the subsequent hydrogenation by using a conventional hydrogenation catalyst; hydrogenated products of cracked waxes derived from high molecular weight polyethylene, and mixtures thereof.

3. A maleated saturated hydrocarbon wax as claimed in claim 2 wherein the average graft chain length is from 1 to 1.5.

4. A maleated saturated hydrocarbon wax as claimed in claim 2 wherein said wax is in the form of an emulsion.

* * * * *